(12) United States Patent
Chatterjee et al.

(10) Patent No.: US 11,868,337 B2
(45) Date of Patent: Jan. 9, 2024

(54) SYSTEMS AND METHODS FOR CORRECTING LABEL BIAS IN DATA

(71) Applicant: Walmart Apollo LLC, Bentonville, AR (US)

(72) Inventors: Anirban Chatterjee, San Bruno, CA (US); Vijay Srinivas Agneeswaran, Bangalore (IN); Subhadip Paul, West Bengal (IN)

(73) Assignee: Walmart Apollo, LLC, Bentonville, AR (US)

( * ) Notice: Subject to any disclaimer, the term of this patent is extended or adjusted under 35 U.S.C. 154(b) by 287 days.

(21) Appl. No.: 17/116,651

(22) Filed: Dec. 9, 2020

(65) Prior Publication Data

US 2022/0179840 A1   Jun. 9, 2022

(51) Int. Cl.
*G06F 16/00* (2019.01)
*G06F 16/23* (2019.01)
*G06N 20/00* (2019.01)

(52) U.S. Cl.
CPC ......... *G06F 16/2365* (2019.01); *G06N 20/00* (2019.01)

(58) Field of Classification Search
CPC .................................................. G06F 16/2365
See application file for complete search history.

(56) References Cited

U.S. PATENT DOCUMENTS 9,424,533 B1   8/2016  Zadeh
10,332,241 B2   6/2019  Zou et al.
2020/0202073 A1*   6/2020  Ghulati ................. G06F 40/205
2020/0380421 A1*  12/2020  Neumann ............ G06V 10/764
2021/0124996 A1*   4/2021  Breugelmans .......... G06F 21/14
2021/0232706 A1*   7/2021  Peruski ................. G06N 20/00
2021/0357747 A1*  11/2021  Mukherjee ............... G06N 3/04

OTHER PUBLICATIONS

Hendrycks, Dan, et al. "Using trusted data to train deep networks on labels corrupted by severe noise." Advances in neural information processing systems 31 (2018).*
Rolnick, David, et al. "Deep learning is robust to massive label noise." arXiv preprint arXiv:1705.10694 (2017).*
Hendrycks et al., "Using Trusted Data to Train Deep Networks on Labels Corrupted by Severe Noise", 32nd Conference on Neural Information Processing Systems (2018) p. 1-10.
Ye et al., "Robust Deep Graph Based Learning for Binary Classification", IEEE (2019) p. 1-12.
Ren et al., "Learning to Reweight Examples for Robust Deep Learning", (2019) p. 1-13.
Chatterjee et al., "A Model-Agnostic Framework To Correct Label-Bias In Training Data Using A Sample Of Trusted Data", (2020) p. 1-14.

* cited by examiner

*Primary Examiner* — Nan Hutton
(74) *Attorney, Agent, or Firm* — Morgan, Lewis & Bockius LLP; Manita Rawat

(57) ABSTRACT

This application relates to systems and methods for automatically correcting labels in untrusted data based on a small sample of trusted data in a training database. In some examples, training data may be divided into a trusted dataset and an untrusted dataset using stratified sampling. An adversarial algorithm may be used to reassign labels in the data samples associated with the untrusted data based on a set of features in the data and labels in the trusted dataset. The untrusted dataset with the reassigned labels may then be used to train a machine learning model.

14 Claims, 6 Drawing Sheets

SYSTEMS AND METHODS FOR CORRECTING LABEL BIAS IN DATA

TECHNICAL FIELD

The disclosure relates generally to correcting label bias in training data based on a sample of trusted data and, more specifically, to systems and methods for proactively correcting labels in untrusted data based on a small sample of trusted data.

BACKGROUND

With the advent of artificial intelligence in real-world application, the results of the artificial algorithms affect users' lives in a variety of different ways. For example, machine learning algorithms are increasingly used to predict user behavior and interests which is ultimately used to provide different recommendations, news articles, etc. to different users. Machine learning algorithms are trained using training datasets to detect features in the data. Larger datasets are increasingly used to train such machine learning models to accurately detect features. The training datasets need to be labeled prior to training. However, various factors affect the robustness and accuracy of the labeled data samples in the training dataset. Biases in training datasets are increasingly common. Noise can be introduced to the training dataset while labeling due to various factors, including but not limited to, automatic labeling, lack of domain expertise of manual labelers, and data poisoning attacks by adversaries. These biases often unfairly disadvantage certain groups. Machine learning models, e.g., classifiers, trained on such biased datasets can inherit the biases; thereby, reducing the accuracy of the outputs of the machine learning models during inference.

Some well known techniques assume that the entirety of labeled training data is untrustworthy (e.g., corrupted). A small amount of trusted data (e.g., incorruptible data) can be curated and leveraged to remove bias from corrupted portion of the data (e.g., untrusted data). However, such techniques rely on the assumption that the adversarial process used to debias the data does not have access to true labels of the data. The techniques fail to provide reliability and accuracy in removing bias from the data in examples where the adversarial process does have access to the true labels of the data.

SUMMARY

The embodiments described herein are directed to automatically correcting labels in untrusted data based on a small sample of trusted data in a database. The embodiments may obtain or receive a dataset (e.g., training dataset) from a database for training a machine learning model (e.g., deep neural network, convolutional neural network). Prior to applying the dataset to a machine learning model, the embodiments may clean the dataset of bias. For example, label bias may be removed from the dataset by leveraging a small amount of trusted data in the dataset. In some examples, a stratified sampling technique may be used to select a portion of the dataset as trusted dataset. The remaining dataset may be determined to be untrusted (e.g., corrupted). The untrusted dataset may then undergo a bias-removal process to generate an unbiased dataset for training the machine learning model. For example, the untrusted dataset may undergo an adversarial process that injects noise to the untrusted dataset based on the trusted dataset.

The embodiments may let the adversarial process determine whether each data sample (e.g., observed label) in the untrusted dataset may include a true label or may be reassigned with an estimated true label determined based on the trusted labels in the trusted dataset, the features of the data, and the observed label. Probability of a trusted label (e.g., true label) in the trusted dataset being a true label for a data sample based on the corresponding observed label for the data sample in the untrusted dataset and the corresponding features may be determined. A predetermined confidence threshold may be used to determine whether the observed label should be changed or remain same for each data sample in the untrusted dataset. In some embodiments, the updated dataset with one or more reassigned labels for untrusted dataset and/or trusted dataset in the trusted dataset may be used to train the machine learning model. As a result, the embodiments of the present disclosure can automatically and significantly reduce labelling bias in training dataset prior to training the machine learning model. It can increase the accuracy of the machine learning model by reducing learned bias prevalent in previous techniques. In addition to or instead of these example advantages, persons of ordinary skill in the art would recognize and appreciate other advantages as well.

In accordance with various embodiments, exemplary systems may be implemented in any suitable hardware or hardware and software, such as in any suitable computing device. For example, in some embodiments, a computing device is configured to obtain a dataset from a database for training a machine learning model. The computing device can select a first portion of the dataset that includes trusted data of the dataset such that a remaining dataset exists. The computing device may then determine whether a corresponding observed label of a data sample in the remaining dataset (e.g., untrusted dataset) is a true label of the data sample, based at least in part on the first portion of the dataset (e.g., trusted dataset). Further, the computing device can generate an updated remaining dataset (e.g., updated untrusted dataset) based on the determination. In some examples, the updated dataset may include one or more labels that are reassigned from observed labels to estimated true labels from the trusted dataset. The computing device may perform operations (e.g., train a machine learning model) using the trusted dataset and the updated remaining dataset.

In some embodiments, a method is provided that includes obtaining training data to train a machine learning model. The method may also include dividing the training data into a trusted dataset and an untrusted dataset. In some examples, stratified sampling may be used to determine the trusted dataset. Further, the method includes updating labels in the untrusted dataset based at least in part on labels in the trusted dataset and injection of noise into the untrusted dataset. The method then includes generating updated untrusted training dataset by denoising the updated labels in the untrusted dataset. The method finally includes training a machine learning model based on the updated untrusted training dataset and the trusted dataset.

In yet other embodiments, a non-transitory computer readable medium has instructions stored thereon, where the instructions, when executed by at least one processor, cause a computing device to perform operations that include obtaining a dataset from a database for training a machine learning model. The instructions, when executed by the at least one processor further cause the computing device to perform operations that include selecting a first portion of the dataset that includes trusted data of the dataset such that a remaining dataset exists. The instructions, when executed by the at least one processor further cause the computing device to perform operations that include determining whether a corresponding observed label of a data sample in the remaining dataset (e.g., untrusted dataset) is a true label of the data sample, based at least in part on the first portion of the dataset (e.g., trusted dataset). Further, the instructions, when executed by the at least one processor further cause the computing device to perform operations that include generating an updated remaining dataset (e.g., updated untrustworthy dataset) based on the determination. In some examples, the updated dataset may include one or more labels that are reassigned from observed labels to estimated true labels determined based on a conditional probability distribution associated with true labels in the trustworthy dataset. The instructions, when executed by the at least one processor further cause the computing device to perform operations that include performing operations (e.g., train a machine learning model) using the trusted dataset and the updated remaining dataset.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
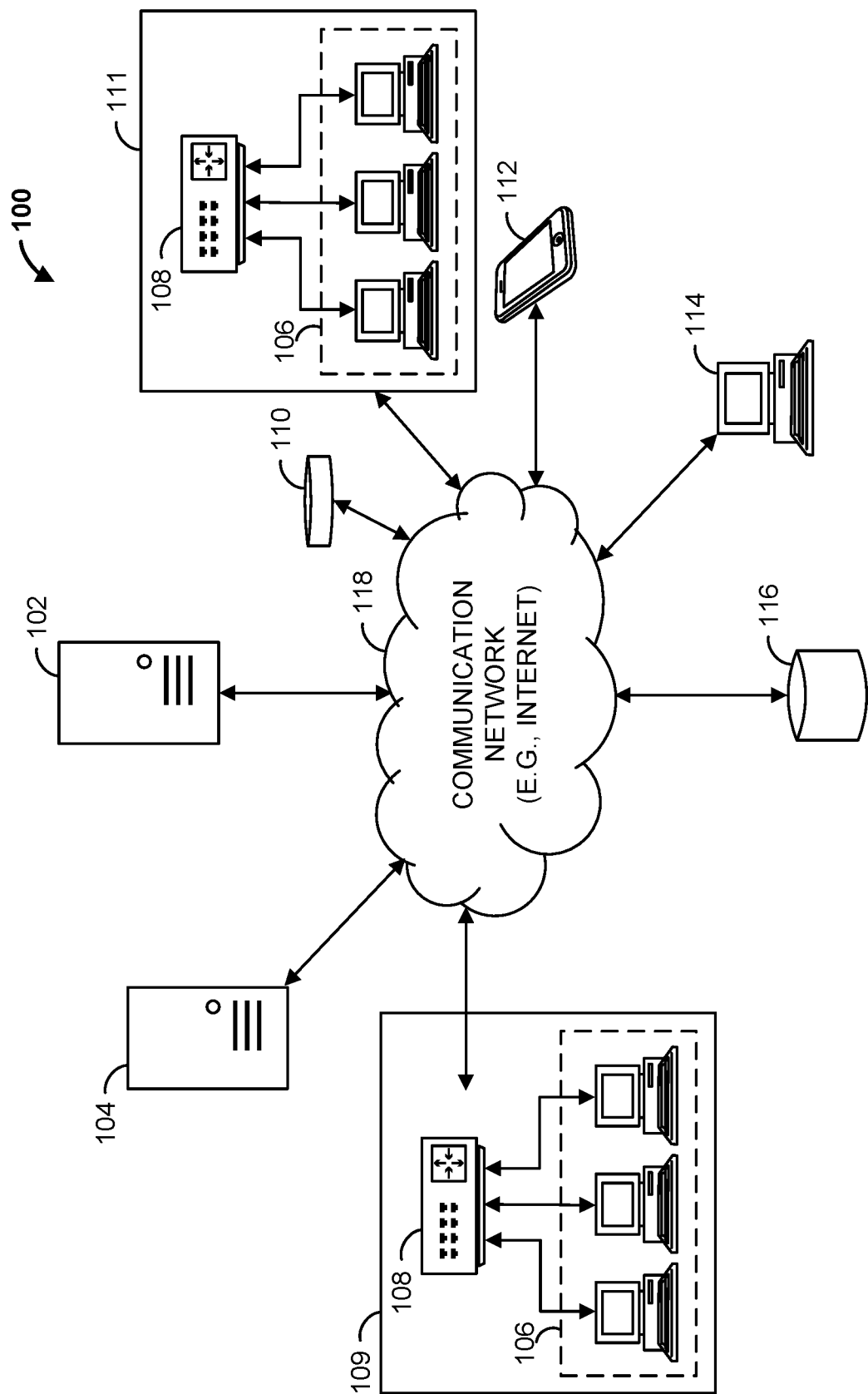
FIG. 1 is a block diagram of a label bias correction system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a label bias correction system 100 that includes a bias correction computing device 102 (e.g., a server, such as an application server), a web server 104, workstation(s) 106, database 116, and multiple customer computing devices 110, 112, 114 operatively coupled over network 118. Advertisement customization computing device 102, workstation(s) 106, server 104, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, bias correction computing device 102 can be a computer, a workstation, a laptop, a server such as a cloud-based server, or any other suitable device. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, bias correction computing device 102 is operated by an entity training the machine learning model, and multiple customer computing devices 112, 114 are operated by customers of the entity.

Although FIG. 1 illustrates three customer computing devices 110, 112, 114, label bias correction system 100 can include any number of customer computing devices 110, 112, 114. Similarly, label bias correction system 100 can include any number of workstation(s) 106, bias correction computing devices 102, servers 104, and databases 116.

Workstation(s) 106 are operably coupled to communication network 118 via router (or switch) 108. Workstation(s) 106 and/or router 108 may be located at a store 109, for example. Workstation(s) 106 can communicate with bias correction computing device 102 over communication network 118. The workstation(s) 106 may send data to, and receive data from, bias correction computing device 102. For example, the workstation(s) 106 may transmit data related to user interactions to bias correction computing device 102. In response, bias correction computing device 102 may transmit an indication of one or more machine learning model results to the workstation(s) 106 in real-time.

In some examples, web server 104 may host one or more web pages, such as a retailer's or merchant's website. Web server 104 may transmit data related to user interactions and/or transaction on the website by a customer or user to bias correction computing device 102. In response, bias correction computing device 102 may transmit an indication of machine learning output to display on the website to the customer. For example, the output of the machine learning model may be displayed on a webpage as a recommendation, on a homepage, or on a webpage dedicated to a category of the recommendation when the customer is browsing that webpage.

First customer computing device 110, second customer computing device 112, and $N^{th}$ customer computing device 114 may communicate with web server 104 over communication network 118. For example, each of multiple computing devices 110, 112, 114 may be operable to view, access, and interact with webpages of a website hosted by web server 104. In some examples, web server 104 hosts a website for a retailer or merchant that allows for the purchase of items. For example, the website may list prices for advertised items. An operator of one of multiple computing devices 110, 112, 114 may access the website hosted by web server 104, add one or more items to an online shopping cart of the website, and perform an online checkout of the shopping cart to purchase the items for the listed prices.

Bias correction computing device 102 is operable to communicate with database 116 over communication network 118. For example, bias correction computing device 102 can store data to, and read data from, database 116. Database 116 can be a remote storage device, such as a cloud-based server, a memory device on another application server, a networked computer, or any other suitable remote storage. Although shown remote to bias correction computing device 102, in some examples, database 116 can be a local storage device, such as a hard drive, a non-volatile memory, or a USB stick.

Communication network 118 can be a WiFi© network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Bias correction computing device 102 can generate bias corrected training data based on a portion of observed data that is defined as trusted data. For example, bias correction computing device may obtain training dataset from database 116. Dataset 116 may include data from a plurality of customers (e.g., users). The training dataset may include observed labels for a set of features. Bias correction computing device 102 may receive the training dataset for correction prior to using the training dataset for training a machine learning model. The training dataset may be sampled to generate or determine a trusted dataset including a small portion of the training dataset, such that a remaining dataset exists. In some examples, stratified sampling may be used to determine the trusted dataset by selecting a number of data samples for each feature. It may be assumed that the labels (e.g., values) in the trusted dataset are true labels of the data. The data samples in the remaining dataset may be determined to be untrusted dataset, that is, dataset including biased labels.

An adversarial process (e.g., algorithm) may be used by bias correction computing device 102 to inject noise into the untrusted labels to change model behavior in a certain way. It may be assumed that the adversarial process has access to the data features and true labels of the untrusted dataset. The adversarial process may transform the untrusted dataset based on the trusted dataset. The transformed untrusted data can then be used to train the machine learning model.

In some examples, the adversarial process may include determining whether each observed label corresponding to a data sample is a true label. The determination may be based on the trusted dataset and the features of the data. For example, during the adversarial process, bias correction computing device 102 may determine a conditional probability distribution that a trusted label from the trusted dataset may be the true label of a data sample of the untrusted dataset give the corresponding observe label and set of features of the data, for each trusted label. The conditional probability distribution may be used to determine the true labels for each of the data samples in the untrusted data.

In some examples, the conditional probability distribution may be dependent on a probability of the observed label being the true label of the data sample, a probability of the label of the trusted dataset being the true label of the untrusted data set given the observed label, and/or a probability distribution of the features of the data sample having the observed label and the label of the trusted database. The probability of the observed label being the true label of the data sample may be based on a number of data samples in the trusted dataset with the observed label and a total number of data samples in the trusted dataset. In some examples, the probability of true label of the data sample being a trusted label in the trusted dataset given the corresponding observed label is based on a number of data samples in the trusted dataset with the observed label but a predicted label using a data distribution of the untrusted dataset as the trusted label of the trusted dataset, and a total number of data samples in the trusted dataset whose label is the observed label.

In some examples, bias correction computing device 102 may determine a confidence of the predictions of true labels of the data samples of the untrusted data. When the confidence is above a predetermined threshold, bias correction computing device 102 may determine that the observed label for that data sample is not a true label. Similarly, when the confidence is below a predetermined threshold, bias correction computing device 102 may determine that the observed label for that data sample is a true label. Bias correction computing device 102 may replace the observed label with the based on the conditional probability distribution when the observed label is determined to not be the true label for the corresponding data sample.

Sampling Training Data for Trusted Dataset

In some examples, bias correction computing device 102 may select trusted dataset from the training data such that the trusted dataset is a good representation of the entire training data. An optimal size of the trusted dataset may then be based on balancing two factors: (1) minimizing the weighted sum of the sampling variances of the estimates of the various features of the data; and (2) minimizing the size of the sample of the trusted dataset as the cost of the maintenance of trusted dataset is proportional to the size of the training dataset.

In some examples, stratified sampling may be used to select the trusted database in order to account for the data being heterogeneous among classes but homogenous within classes (e.g., features). Assuming that the training dataset has L different classes or strata and each data sample contains p features, an optimal allocation of data samples to various strata may be determined by minimizing the weighted sum of the variances of the stratified samples means of all that p features, as follows:

$$\overline{x_{j,st}} = \Sigma_{h=1}^{L} W_h x_{j,h} \quad \text{(eq. 1)}$$

where $x_{j,h}$ denotes the mean of the variable $x_j$ in stratum h, $$W_h = \frac{N_h}{N},$$

where $N_h$ refers to a number of data samples in stratum h, and $N=\Sigma_{h=1}^{L}N_h$. The stratified sample mean $\overline{x_{j,st}}$ estimates the population mean $x_j$ for the variable $x_j$. The weighted sum $\Sigma_{j=1}^{P}a_j \text{var}(\overline{x_{j,st}})$ where:

$$\text{var}(\overline{x_{j,st}}) = \sum_{j=1}^{L} \frac{W_h^2 S_{jh}^2}{n_h} - \sum_{j=1}^{L} \frac{W_h^2 S_{jh}^2}{N_h} \quad (\text{eq. 2})$$

where $S_{jh}$ denotes the variance of the $j^{th}$ feature of the data in stratum h and $n_h$ denotes the number of data samples to be selected from stratum h.

In some examples, positive weights, $a_j$, may be assigned to the various features, j. The weights may be determined such that the weight for a feature is proportional to the sum of the stratum variances for the feature, $x_j$. This allows the bias correction computing device 102 to account for values for $S_{jh}^2$ being large when the population is heterogeneous for a given feature. As such, when $\Sigma_{j=1}^{P}a_j$, the weights may be determined as follows:

$$a_j = \frac{\sum_{h=1}^{L} S_{jh}^2}{\sum_{j=1}^{P} \sum_{h=1}^{L} S_{jh}^2} \quad (\text{eq. 3})$$

In some examples, a linear cost function may be defined as $C_0 + \Sigma_{h=2}^{L} c_h n_h$, where $c_h$ denotes a cost associated with selecting $n_h$ data samples from stratum h. Bias correction computing device 102 may determine the optimal sample for the trusted dataset from the training dataset with a fixed cost, $C_0$ as follows $$\underset{n_1 \ldots n_h}{\text{minimize}}\, z = \sum_{j=1}^{P} a_j \text{var}(\overline{x_{j,st}}) \quad (\text{eq. 4})$$

subject to (eq. 5)

$$c_0 + \sum_{h=1}^{L} c_h n_h \leq C_0,$$
$$l \leq n_h \leq N_h,$$
$$n_h \in \mathbb{Z},$$
$$\forall h$$

In some examples, $C_0$ may be preselected. In some examples, $C_0$ may be set to a target size of the trusted dataset and $c_h=1\, \forall h$. It should be noted that any desired value of $C_0$ may be used.

In some example, a plurality of cost constraints may be used to avoid imbalance between classes. For example, constraints of cost of selecting $n_h$ data samples from various classes may be imposed. In one examples, constraint, $c_h=b_h \forall h$ may be used in the optimization process by tuning $b_h$ properly $\forall h$ based on the size of class. In another example, applying constraint, $l \leq n_h \leq N_h$, may be used to ensure that at least a set number, l, od data samples are picked from each of the classes. The value of the minimum number of data samples from each class may be predetermined.

Conditional Probability Distribution Calculation

In some examples, the untrusted (e.g., corruptible) dataset may be a portion of the training data that is vulnerable to external noise or adversarial attack. The untrusted dataset may include a set of features and a corresponding label. Bias correction computing device 102 may assume that the untrusted data is susceptible to label noise from adversarial process such that the adversarial process has access to the features and corresponding true labels of the data. Bias correction computing device 102 may determine how to inject noise into labels of the untrusted dataset to affect the learning and behavior of the machine learning model.

In some examples, bias correction computing device 102 may utilize adversarial process, $\phi$, to transform untrusted dataset, $z=(x_u,y)$, to updated untrusted dataset, $\hat{z}=(x_u,\tilde{y})=\phi(z,\theta)$, where $x_u$ represents the set of features, y represents the corresponding observed label, $\tilde{y}$ represents the corresponding true label (e.g., estimated true label), $\theta$ represents parameters of the adversarial process. Bias correction computing device 102 may assume, in this way, that the observed labels and the corresponding true labels are dependent on each other given the set of features (i.e., $(y\tilde{y})|x_u$).

In some examples, bias correction computing device 102 may generate a classification model, M trained (e.g., built) based on the untrusted dataset, z. Similarly, bias correction computing device 102 may generate a classification model, $\hat{M}$, based on the updated untrusted dataset, $\hat{z}$. A reverse transformation function, $\psi$, may be estimated such that $\psi(\hat{z}) \approx z$, in order to keep the classification model and the updated classification model as similar as possible. It may be assumed that the adversarial process has access to the trusted dataset, $z_t=(x_t,y) \in Z_t$, which may never be corrupted. In some examples, the estimated transformation function may have no information regarding the percentage of the training data that is corrupted or which instances of the training data are corrupted.

In some examples, the transformation function may be generated as an estimated conditional probability distribution, $p(y|\tilde{y},x_u)$ for each data sample in the untrusted dataset. The conditional probability distribution may indicate a relationship between the trusted and the untrusted dataset in the training data. Bias correction computing device 102 may toggle the updated label (e.g., estimated true label, updated untrusted label) of each data sample in the untrusted dataset which maximizes the conditional probability distribution. In some examples, the conditional probability distribution may be determined as follows for data in a continuous space:

$$p(y|\tilde{y},x_u) = \frac{p(y)p(\hat{y}|y)p(x_u|y,\tilde{y})}{\int p(y)p(\tilde{y}|y)p(x_u|y,\tilde{y})dy} \quad (\text{eq. 6})$$

where p(y) indicates a probability of the observed label (e.g., untrusted label) being the true label of the data sample, $p(\tilde{y}|y)$ indicates a probability of the updated untrusted label being the true label of the data sample given the observed label, $p(x_u|y,\tilde{y})$ indicates a probability distribution of the features of the data sample having the observed label and the updated label in the classification and the updated classification model.

In examples where the untrusted data is in discrete space, the conditional probability distribution may be estimated as follows:

$$p(y|\tilde{y},x_u) = \frac{p(y)p(\hat{y}|y)p(x_u|y,\tilde{y})}{\sum_{y \in \mathcal{Y}} p(y)p(\tilde{y}|y)p(x_u|y,\tilde{y})}. \quad (\text{eq. 7})$$

In some examples, probability of the observed label (e.g., untrusted label) being the true label of the data sample may be estimated as follows:

$$p(y_i) = \frac{n_i}{n} \quad \text{(eq. 8)}$$

where $n_i$ is the number of data samples in the trusted dataset having label $y_i$, and n is the total number of data samples in the trusted dataset.

In some examples, probability (i.e., $p(\tilde{y}|y)$) of the updated untrusted label being the true label of the data sample given the observed label may be estimated using the classification model built on the labeled untrusted dataset. Bias correction computing device 102 may compute $\tilde{y}=M_u(x)$ for every $x \in Z_t$. As such, the updated untrusted label may be computed for every feature in the trusted dataset using the classification model built on untrusted dataset to estimate untrusted labels of the trusted dataset had the trusted dataset been exposed to bias (e.g., adversarial attack).

In some examples, bias correction computing device 102 may then determine an empirical estimation of $p(\tilde{y}|y)$ as follows $$p(\tilde{y}|y) = \frac{n_{\tilde{y}}}{n_y} \quad \text{(eq. 9)}$$

where $n_{\tilde{y}}$ represents number of data samples from trusted dataset whose true label is y and predicted label by the classification model built on the labeled untrusted dataset is $\tilde{y}$, and $n_y$ represents the total number of data samples in the trusted dataset with true label (e.g., observed label) is y.

In some examples, bias correction computing device 102 may assume that data samples belonging to multiple labels or classes are separable. If the data is not separable, bias correction computing device 102 may project the data samples from their original space to a different space to make them more separable. Any know projection technique may be used. Bias correction computing device 102 may then estimate probability distribution of the features of the data sample having the observed label and the updated label in the classification and the updated classification model by estimating the underlying distribution of the data samples whose true label is y and untrusted label is $\tilde{y}$, if the data labels were subjected to noise (e.g., adversarial attack).

In some examples, a parameterized form of the underlying distribution may be assumed to estimate the parameters required for estimating the underlying distribution of the data samples belonging to a certain class. Any know parameterization method may be used. In some examples, multi-variate normal distribution may be assumed when there are sufficient data samples in the corresponding class. In other examples, non-parametric estimation of distribution may be used for a more generalized approach.

In an example, for synthetic training dataset where bias correction computing device 102 may have knowledge about the data generation proves, a multi-variate normal distribution may be assumed as the parametric form of the underlying distribution of data to determine or generate the probability distribution of the features of the data sample having the observed label and the updated label in the classification and the updated classification model.

In examples where bias correction computing device 102 may not have prior information about the underlying distribution of data, the probability distribution of the features of the data sample having the observed label and the updated label in the classification and the updated classification model as follows:

$$\hat{p}(x_u|y,\tilde{y}) = \frac{1}{nh^d}\sum_{i=1}^{n} K\left(\frac{x_u - x_i}{h}\right)\hat{p}(y,\tilde{y}) \quad \text{(eq. 10)}$$

where $$K(u) = \frac{1}{\sqrt{2\pi}} \exp\left[-\frac{\|u\|^2}{2}\right],$$

and d represents the number of dimensions. In some examples, $\hat{p}(y,\tilde{y}) = \hat{p}(y|\tilde{y})\hat{p}(y)$.

Confidence Processing for Label Predictions

In some examples, bias correction computing device 102 may determine a confidence of the predicting a true label for the untrusted dataset. The confidence of the predictions (e.g., adversarial process) may be determined as follows:

$$\text{Conf}(P, x_u) \stackrel{\text{def}}{=} 1 + \Sigma_{c \in C} p(c|x_u) \ln(p(c|x_u)) \quad \text{(eq. 11)}$$

where P is the predictions, $p(c|x_u)$ indicates the predicted probability of c being the true label of the data sample, $x_u$, by P. It should be noted that $1 - \log n \leq \text{Conf}(P, x_u) \leq 1$ where n is the number of classes in the training data.

De-Noising Untrusted Dataset

In some examples, bias correction computing device 102 may recover true labels and update the untrusted dataset with them. Bias correction computing device 102 may reassign labels to each data sample in the untrusted data based on a predetermined confidence threshold as follows:

$$\text{label}(x_u) = \begin{cases} \text{argmax}_{y \in Y} p(y|\tilde{y}, x_u) & \text{if } \text{Conf}(P, x_u) \geq \epsilon \\ \tilde{y} & \text{if } \text{Conf}(P, x_u) > \epsilon \end{cases} \quad \text{(eq. 12)}$$

As such, the observed label of the untrusted dataset may only be altered when the confidence of the adverse process is over a threshold, such that the adverse process is confident enough about the true label of the data point.

In some examples, where the untrusted data does not include corruption or bias, the adverse process may not alter the labels of the untrusted data. For example, when there is zero bias in the untrusted data, the true labels and the observed labels may represent the same random variable. As such, the following may be the output of the adverse process:

$$p(y=y_i|\tilde{y}=y_j, x) = p(y=y_i|y=y_j, x) = \begin{cases} 1 & \text{if } i=j \\ 0 & \text{if } i \neq j \end{cases} \quad \text{(eq. 13)}$$

The bias correction computing device 102 may not alter the label of any data sample in the untrusted dataset in the process of de-noising the data when the untrusted data does not include any bias.

In some examples, when external adversary injects bias into the training data without having access to the true labels of the untrusted dataset, the adversarial process may nevertheless determine the true labels of the untrusted data using the process described herein. As described above, the noise may be generated by the process, $\tilde{y}=f(\theta_1^T y, \theta_2^T x)$ for injecting the noise into the labels of the untrusted dataset, which may be dependent on both true labels and the set of features. However, the adversarial process may not make any assumptions regarding the values of parameters $\theta_1$ and $\theta_2$. The parameters may be learned from the trusted and the untrusted dataset. As such, when the noise is injected into the labels of the untrusted dataset is only dependent on the set of features, the parameter $\theta_1$ may be learned to be 0.

In some examples, when the multiple classes are completely separable, the confidence of the adversarial process may be maximally increased. For example, when classes are completely separable, the following equality holds where $p_i$ indicates the probability of a data sample x belonging to the class i:

$$p_i = \begin{cases} 1 & \text{if } x \text{ belongs to class } i \\ 0 & \text{otherwise} \end{cases} \quad \text{(eq. 14)}$$

As such, the upper-bound of the confidence of the adversarial process to predict the true labels of a data sample form the untrusted dataset may be 1 when the classes are completely separable.

In some example, when the multiple classes are inseparable, the confidence of the adversarial process determined by bias correction computing device 102 may be minimized. For example, when $p_i$ is the probability of a data sample, x, belonging to class i, the probability may be represented by $p_i = k \forall i$ where k is a constant defined as $0 \le k \le 1$. Bias correction computing device 102 may then determine the lower-bound of the confidence of the adversarial process as follows:

$$\begin{aligned} Conf(P, x_u) &= 1 + \sum_{i=1}^{n} p_i \log p_i \quad \text{(eq. 14)} \\ &= 1 - \sum_{i=1}^{n} p_i \log 1/p_i \\ &= 1 - nk \log \frac{1}{k} (p_i = k \forall i) \\ &= 1 - \log\left(nk \cdot \frac{1}{k}\right) \text{ (Jensens inequality)} \\ &= 1 - \log n \end{aligned}$$

where $(1-\log n) < 1$ as $n \ge 2$. In some examples, when the classes are partially separable, the confidence of the adversarial process may vary between the lower-bound and the upper-bound.

Figure 2:
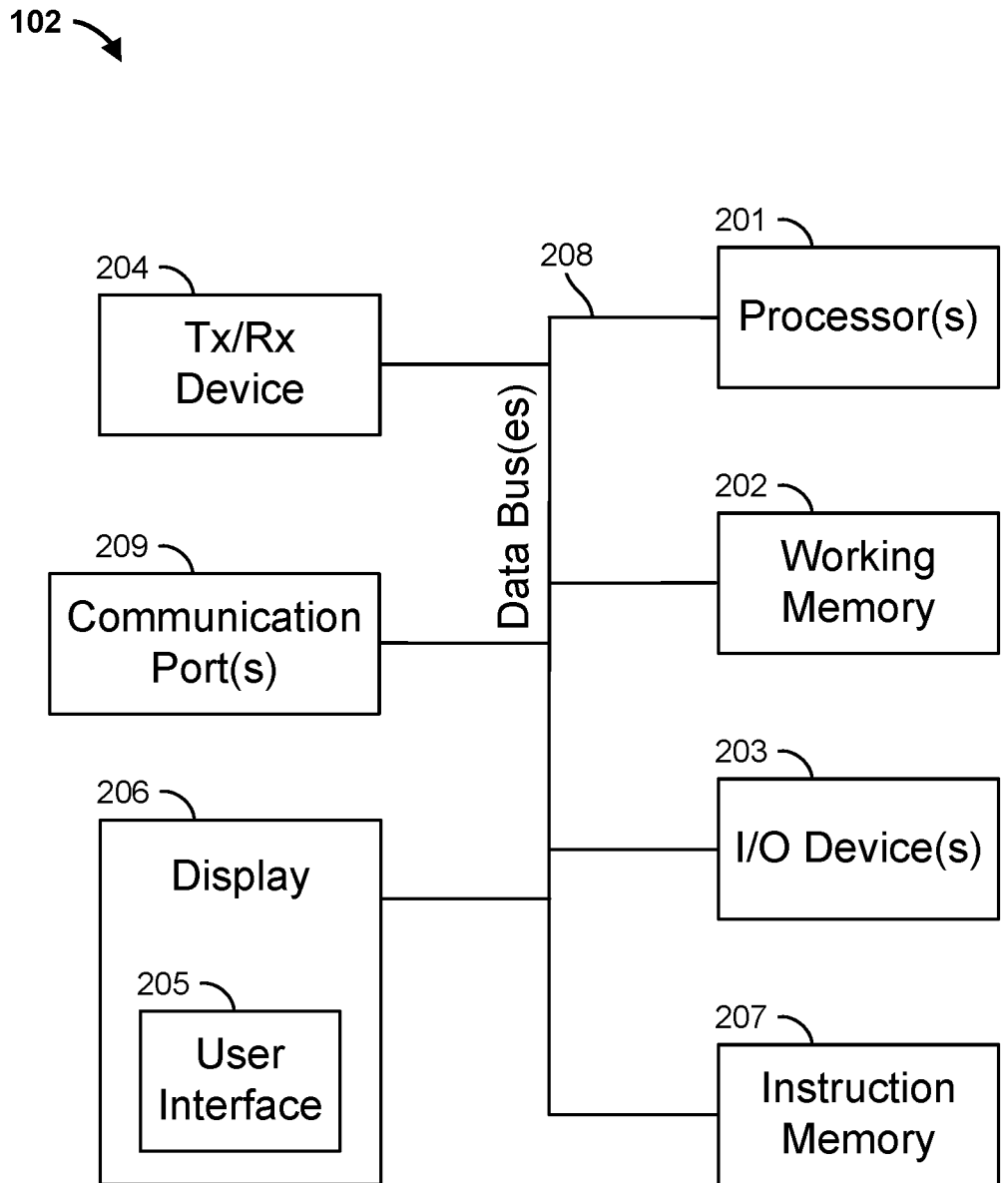
FIG. 2 is a block diagram of bias correction computing device of bias correction system of FIG. 1 in accordance with some embodiments.

FIG. 2 illustrates the bias correction computing device 102 of FIG. 1. Bias correction computing device 102 can include one or more processors 201, working memory 202, one or more input/output devices 203, instruction memory 207, a transceiver 204, one or more communication ports 209, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of bias correction computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as machine learning algorithm training data.

Display 206 can display user interface 205. User interfaces 205 can enable user interaction with advertisement customization computing device 102. For example, user interface 205 can be a user interface for an application of a retailer that allows a customer to view and interact with a retailer's webpage. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 and bias correction computing device 102 will be operating in. Processor(s) 201 is operable to receive data from, or send data to, a network, such as communication network 118 of FIG. 1, via transceiver 204.

Figure 3:
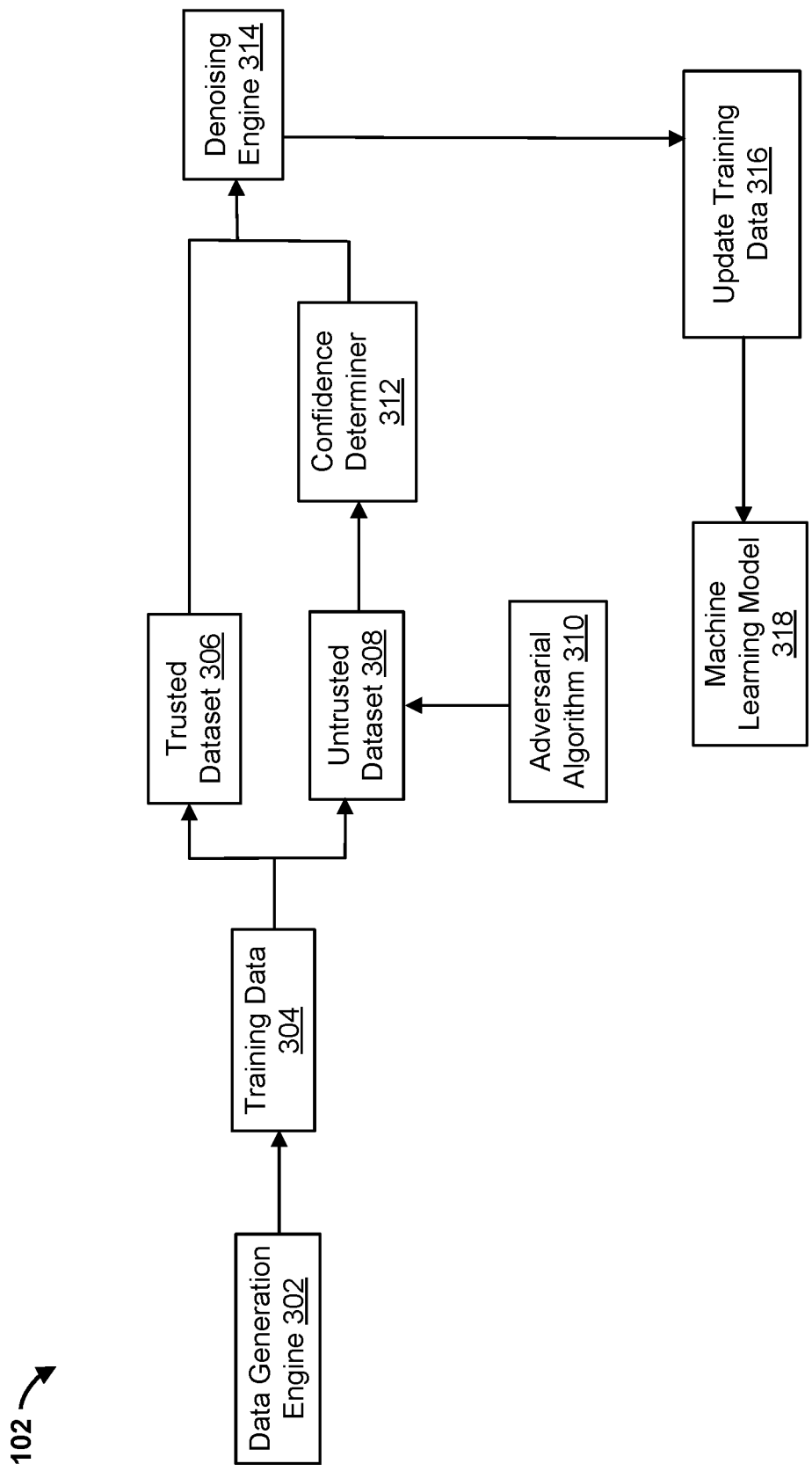
FIG. 3 is a block diagram illustrating examples of various portions of bias correction computing device of FIG. 1 in accordance with some embodiments.

Turning now to FIG. 3, a block diagram illustrating examples of various portions of bias correction computing device 102. Bias correction computing device 102 can include the data generation engine 302, adversarial algorithm 310, denoising engine 314, and machine learning model 318. Data generation engine 302 may generate training data 304 based on data from database 116. Data generation engine 302 may coupled to database 116 via any communication link or suitable connection, including wired or wireless connections, such as for example, the network 118 (FIG. 1). Training data 304 may include the training dataset for training machine learning model 318.

The bias correction computing device 102 can be used in connection with various network-enabled tools. Example network-enabled tools include, without limitation, workstations, laptops, telephones, mobile telephones, smartphones, smart speakers, smart screens, tablets, servers, operating systems, customer service systems, voicemail systems, email systems, digital messaging systems and other computing devices.

Training data 304 can include corrupted or biased data. For example, training dataset can include data that is biased against certain groups. Training a machine learning model using biased data may inherit the biases that were in the training dataset. Training dataset must be curated for trusted dataset to ensure that the model aligns with various organizational policies. Biased noise may be injected in the training dataset while labeling. For examples, bias may be injected in the training dataset due to automatic labeling, manual labeling without adequate domain expertise, and data poising attacks by adversaries. Hence training dataset must be monitored for biases or corruption prior to training the machine learning model in order to ensure fairness of the model.

As such training data 304 may be curated to generate trusted dataset 306 and untrusted dataset 308. Bias correction computing device 102 may assume that a small amount of data in the training dataset is uncorruptible (e.g., trusted) and the rest is corruptible (e.g., untrusted). A sampling technique can be used to determine or generate trusted dataset 306 from the training dataset. In some examples, stratified sampling may be used to sample the training dataset for trusted dataset 306. For examples, a number of data samples may be selected from a plurality of strata for each class based on: (1) minimizing the weighted sum of the sampling variances of the estimates of the various features; and (2) minimizing the size of the trusted dataset as the cost of maintenance of trusted dataset is proportional to the size of the training dataset. The remaining data samples in the training dataset not included in the trusted dataset may then be included in the untrusted dataset 308.

An adversarial algorithm 310 may inject noise into the untrusted dataset 308, assuming that the labels of the untrusted dataset are dependent on the various features of the data samples and the labels of the trusted dataset 306. Adversarial algorithm 310 can use the adversarial process to update labels in the untrusted dataset 308 based on the labels of the trusted dataset 306. A probability of the true label of a data sample being a label in the trusted dataset, given the observed label (e.g., untrusted label) and the set of features of the data. A conditional probability distribution may be generated based on the conditional probabilities generated for each data sample based on each trusted label in the trusted dataset. In some examples, the conditional probability may be generated based on a probability of the observed label being the true label of the data sample, a probability of the label of the trusted dataset being the true label of the untrusted data set given the observed label, and/or a probability distribution of the features of the data sample having the observed label and the label of the trusted database.

A confidence of the adversarial algorithm 310 in determining true labels of the data samples in the untrusted dataset 308 can be determined for each data sample in untrusted dataset 308 by confidence determiner 312 using eq. 14 above. Denoising engine 314 may recover true labels of the data samples in the untrusted dataset 308 based on the confidence corresponding to the data sample being above or below predetermined threshold (e.g., 0.5), using eq. 15. Updated untrusted dataset may be generated by removing noise in the untrusted dataset 308. For example, observed label of a data sample in the untrusted dataset 308 may be updated to a label in the trusted dataset 306 with the highest conditional probability in the conditional probability distribution for that data sample when the confidence corresponding that data sample is over the predetermined threshold. For each data sample where the confidence is below the predetermined threshold, the observed label may be preserved in the updated untrusted dataset.

Updated training data 316 may then be determined or generated that includes the trusted dataset 304 and the updated untrusted dataset generated by denoising engine 314. Machine learning model 318 can then be trained on the updated training data 316 that includes the recovered true labels for the data samples in the untrusted dataset.

Figure 4:
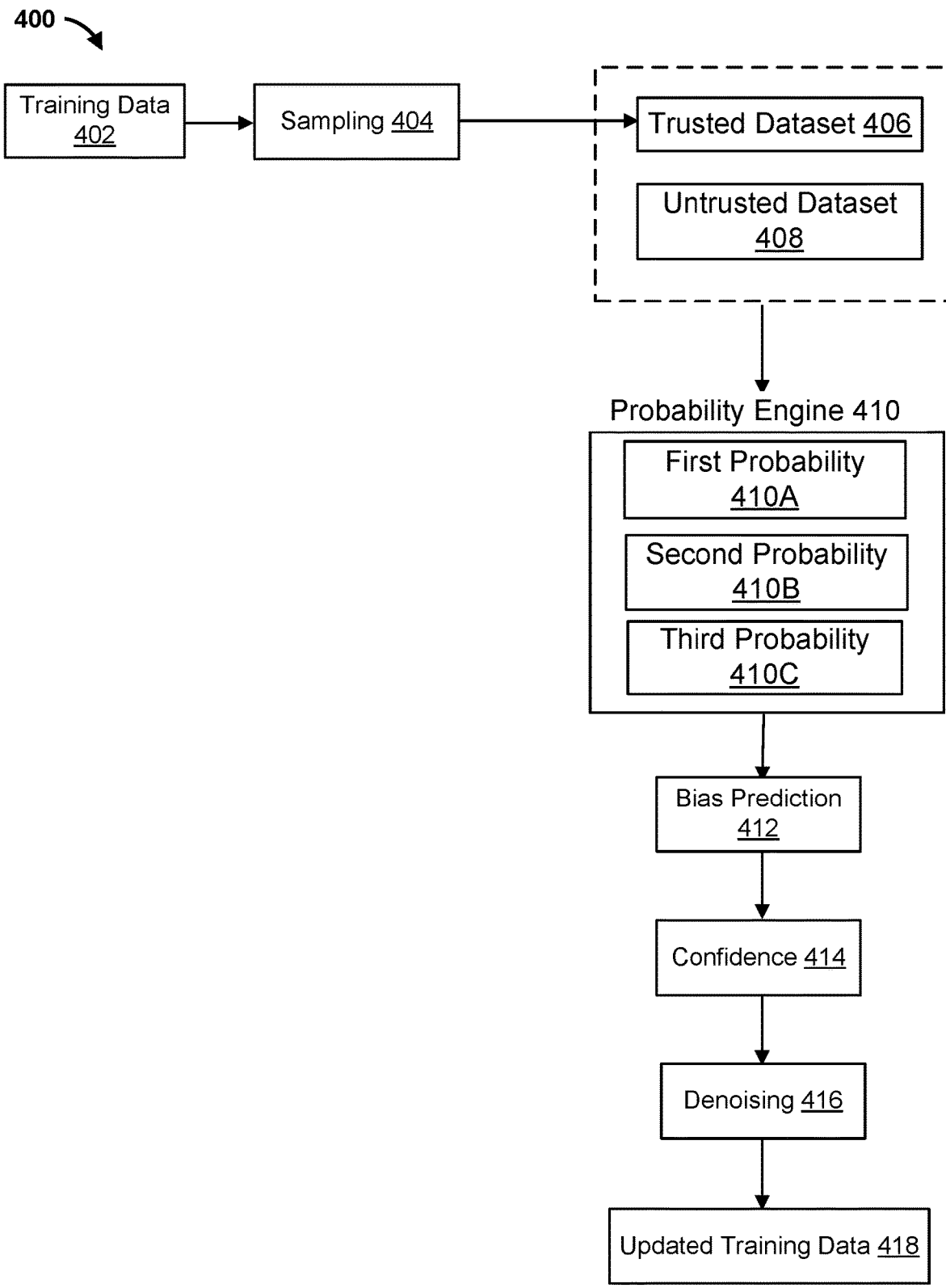
FIG. 4 is an example process flow illustrating a process of correcting label bias using the label bias correction system of FIG. 1 in accordance with some embodiments.

Turning now to FIG. 4, an example process flow 400 is shown. The process flow 400 illustrates how the label bias correction system 100 can correct label bias in the training data prior to training a machine learning model. The process 400 can begin when training data 402 is received or obtained by bias correction computing system 102 from database 116. Such training data 402 can be received via a communications network, such as network 118. Sampling 404 can be performed on the training data 402 to generate trusted dataset 406 and untrusted dataset 408. For example, stratified sampling techniques may be used to determine a small portion of the training data that is assumed to be uncorruptible. The uncorruptible data can then be used as trusted dataset 406 and the remaining data not in the uncorruptible data can be used as corruptible data in the untrusted dataset 408.

A probability engine 410 may then operate on the untrusted dataset 408 based on the trusted dataset 406 to generate bias predictions. For example, adversarial process 308 may be used to inject noise into the untrusted dataset 408 to predict bias in the untrusted dataset 408. In some examples, probability engine 410 may generate conditional probability distribution for each data sample in the untrusted dataset based on the trusted labels in the trusted dataset. The conditional probability distribution may be dependent on a first probability 410A of the observed label being the true label of the data sample, a second probability 410B of the label of the trusted dataset being the true label of the untrusted data set given the observed label, and/or a third probability 410C distribution of the features of the data sample having the observed label and the label of the trusted database. The first probability 410A of the observed label being the true label of the data sample may be based on a number of data samples in the trusted dataset with the observed label and a total number of data samples in the trusted dataset. In some examples, the second probability 410B of true label of the data sample being a trusted label in the trusted dataset given the corresponding observed label is based on a number of data samples in the trusted dataset with the observed label but a predicted label using a data distribution of the untrusted dataset as the trusted label of the trusted dataset, and a total number of data samples in the trusted dataset whose label is the observed label.

Bias prediction 412 for each data sample in the untrusted data may be determined based on the corresponding conditional probability distribution. A confidence 414 may be determined for each data sample in the untrusted dataset 408 that indicates a confidence of the bias prediction 412 predicting a true label for the untrusted dataset for the corresponding data sample. The confidence 414 may be used to determine whether de-noising 416 must be performed on the data sample. Denoising 416 may recover true labels for the data samples in the untrusted dataset 408 based on a predetermined confidence threshold. For each data sample with confidence 414 higher than a predetermined threshold, a trusted label in the trusted dataset 406 with the highest conditional probability in the conditional probability distribution for the corresponding data sample may be used to replace the observed label (e.g., untrusted label). In some examples, the observed label of a data sample may be preserved as a true label when corresponding confidence 414 is lower than the predetermined threshold. An updated training data set 418 may be generated using the recovered true labels of the untrusted dataset 408 and the trusted dataset.

As can be appreciated, the process 400 is a simplified illustration of the processing that occurs to arrive at the updated training dataset 418. In other examples, the process 400 can include other steps or other sub-processes in addition to, or in other sequences, from the one illustrated. As can also be appreciated, the process 400 or the elements thereof can be repeated multiple times during a single interaction between a user and a personal agent, network-enabled tool, retailer's website or online store.

Figure 5:
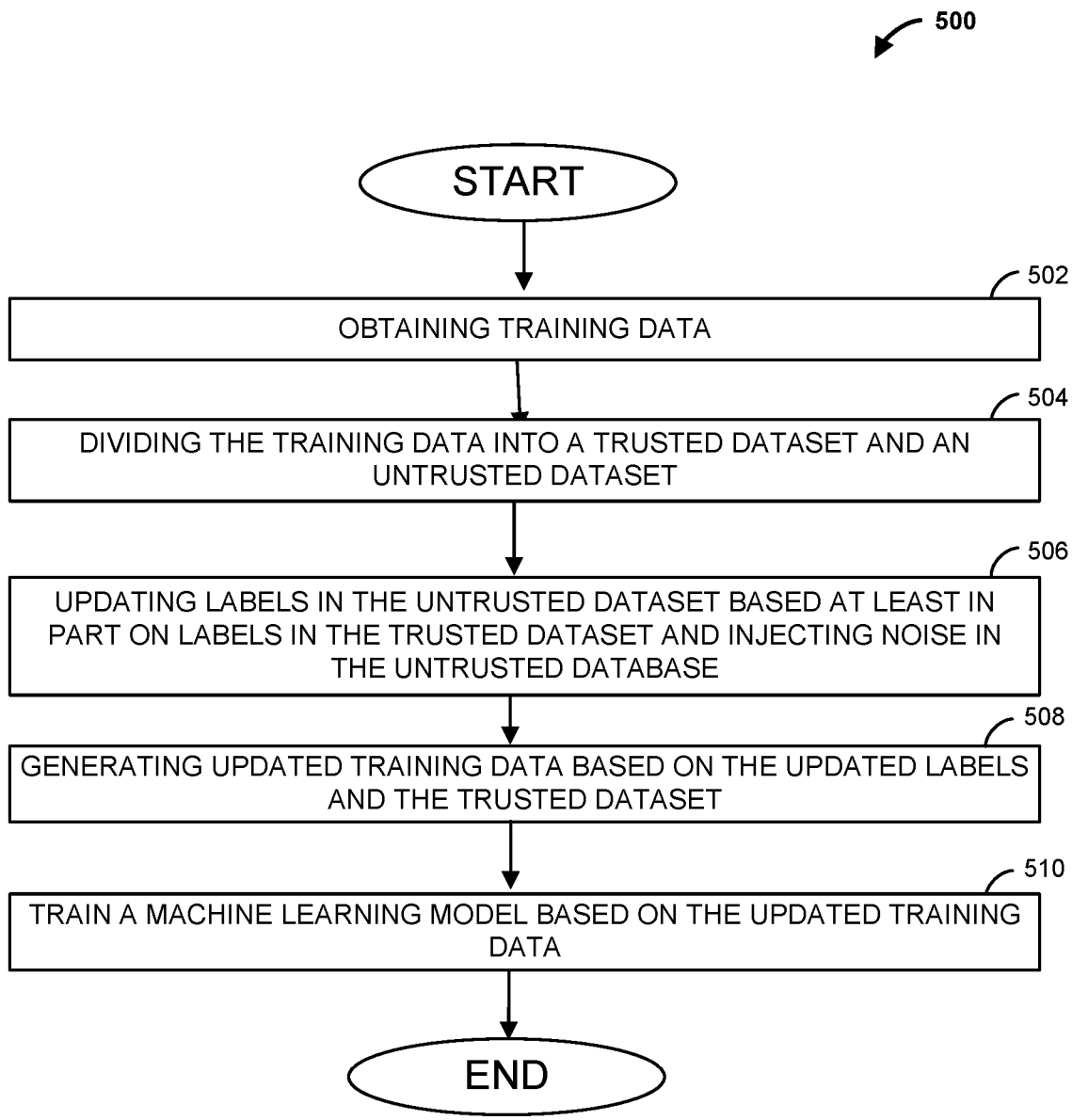
FIG. 5 is a flowchart of an example method that can be carried out by the label bias correction system of FIG. 1 in accordance with some embodiments.

Referring now to FIG. 5, an example method 500 for correcting label bias in training data based on a sample of trusted data is illustrated. The method begins at step 502 when the label bias correction system 100 obtains training data for training a machine learning model. For example, bias correction computing device 102 may obtain the training data from the database 116 that stores the training data for training a corresponding machine learning model. The bias correction computing device 102 may divide the training data into a trusted dataset and an untrusted dataset at step 504. For example, the training data 304 may be divided in trusted dataset 306 and untrusted dataset 308.

At step 506, the bias correction computing device 102 may update observed labels in the untrusted dataset based at least in part on trusted labels in the trusted dataset and injecting noise in the untrusted dataset. For example, adversarial algorithm 310 may inject noise in the untrusted dataset 308 based on trusted labels in the trusted dataset 306 to generate updated training data 316. Adversarial algorithm 310 may inject noise into the untrusted dataset 308 to reassign labels to the data samples in the untrusted dataset.

At step 508, the method 500 includes generating updated training data based on the updated labels and the trusted dataset. For example, bias correction computing device 102 generates updated training data 316 including updated labels for data samples in the untrusted dataset 308 and trusted data samples in the trusted dataset 306.

At step 510, a machine learning model may be trained based on the updated training data. For example, machine learning model 318 may be trained using the updated training data 316. As shown, the method 500 ends following step 510.

Figure 6:
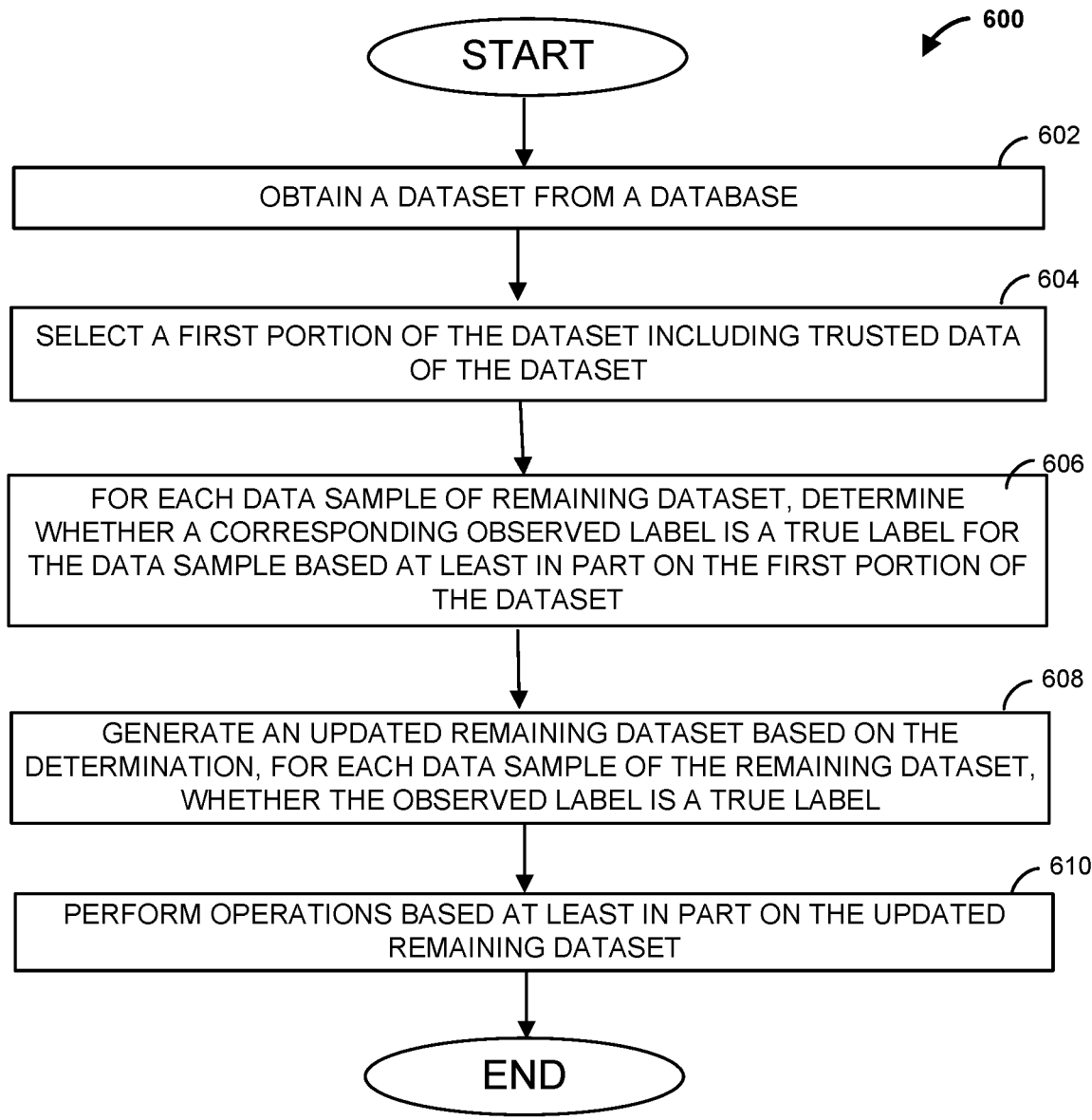
FIG. 6 is a flowchart of another example method that can be carried out by the label bias correction system of FIG. 1 in accordance with some embodiments.

FIG. 6 illustrates another example method of the present disclosure. Example method 600 illustrates another method of correcting label bias in training data based on a sample of trusted data is illustrated. The method begins at step 602, when a dataset is obtained from a database. For example, bias correction computing device 102 may obtain a dataset including training data for training a machine learning model from database 116. At step 604, a first portion of the dataset including trusted data of the dataset is selected such that a remaining dataset exists. For example, a small portion of the training data 304 may be selected that includes trusted dataset 306 by sampling the training data. In some examples, stratified sampling may be used to select the trusted dataset 306.

At step 606, bias correction computing device 102 determines, for each data sample of the remaining dataset, whether a corresponding observed label is a true label based at least in part on the first portion of the dataset. For example, adversarial algorithm 310 and denoising engine 314, alone or in combination, may determine, for each data sample of untrusted dataset 308 (i.e., remaining dataset), whether a corresponding observed label is a true label based on the trusted dataset 306.

At step 608, bias correction computing device 102 generates an updated remaining dataset based on the determination, for each data sample of the remaining dataset, whether the observed label is a true label. For example, denoising engine 314 may generate updated training data 316 based on determining whether, for each data sample of the untrusted dataset 308, the observed label is a true label.

At step 610, bias correction computing device 102 preforms operations based at least in part on the updated remaining data. For example, machine learning model 318 may be trained using the updated training data 316 that includes the updated untrusted data set. As shown, the method 600 ends following step 610.

While not shown in FIGS. 5 and 6, the bias correction computing device 102 can continuously update the updated training data and the machine learning as the machine learning model continuously learns due to the increased data that is available to the machine learning model once the machine learning model is actively used to generate predictions. As such, adversarial process may be continuously used to correct bias as new data is received.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a memory having instructions stored thereon, and a processor configured to read the instructions to:
obtain a dataset from a database;
select a first portion of the dataset including trusted data of the dataset such that a remaining dataset exists, wherein the first portion of the dataset is selected using stratified sampling of the dataset;
generate a first classification model based on the remaining dataset;
generate an updated untrusted dataset by simulating exposure of the remaining dataset to an adversarial process;
generate a second classification model based on the updated untrusted dataset;
for each data sample of the remaining dataset, determine whether a corresponding observed label is a true label for the data sample based at least in part on the first portion of the dataset, wherein the determination is based on an estimated reverse transformation function for the first classification model and the second classification model;
generate an updated remaining dataset based on the determination, for each data sample of the remaining dataset, whether the observed label is a true label for the data sample; and
train a machine learning model based on the updated remaining dataset and the first portion of the dataset by:
for each data sample of the remaining dataset, determining a probability of the corresponding observed label being a true label; and
determining, for each data sample of the remaining dataset, whether the corresponding observed label is a true label based on the probability, wherein determining whether the corresponding observed label is the true label is based on a confidence of the processor to have correctly determined the probability.

2. The system of claim 1, wherein the probability is determined based on one or more of a first probability of the observed label being the true label for the corresponding data sample, a second probability of the true label for the corresponding data sample being a trusted label from the first portion of the dataset given the observed label of the data sample, and a probability distribution of features of the data sample having the observed label and the corresponding trusted label.

3. The system of 1, wherein the processor is further configured to:
determine a portion of the remaining dataset with a set of first data samples where corresponding observed labels are not true labels; and
update the portion of the remaining dataset by replacing the corresponding labels with a trusted label from the first portion of the dataset.

4. The system of claim 1, wherein a size of the first portion of the dataset is based at least in part on minimizing a weighted sum of sampling variances of features associated with the dataset.

5. The system of claim 1, wherein a size of the first portion of the dataset is based at least in part on a linear cost function.

6. The system of claim 1, wherein for each data sample of the remaining dataset, determining whether a corresponding observed label is a true label is based at least in part on assuming that the true labels of the data samples are related to the corresponding observed labels.

7. The system of claim 1, wherein the updated remaining dataset is generated as the remaining dataset based on the determination, for each data sample of the remaining dataset, that the corresponding observed label is a true label for the data sample.

8. A computer-implemented method comprising:
obtaining a dataset from a database;
selecting a first portion of the dataset including trusted data of the dataset such that a remaining dataset exists, wherein the first portion of the dataset is selected using stratified sampling of the dataset;
generating a first classification model based on the remaining dataset;
generating an updated untrusted dataset by simulating exposure of the remaining dataset to an adversarial process;
generating a second classification model based on the updated untrusted dataset;
for each data sample of the remaining dataset, determining whether a corresponding observed label is a true label for the data sample based at least in part on the first portion of the dataset, wherein the determination is based on an estimated reverse transformation function for the first classification model and the second classification model;
generating an updated remaining dataset based on the determination, for each data sample of the remaining dataset, whether the observed label is a true label for the data sample and performing at least one operation based at least in part on the updated remaining dataset; and
training a machine learning model based on the updated remaining dataset and the first portion of the dataset by:
for each data sample of the remaining dataset, determining a probability of the corresponding observed label being a true label; and
determining, for each data sample of the remaining dataset, whether the corresponding observed label is a true label based on the probability, wherein determining whether the corresponding observed label is the true label is based on a confidence of having correctly determined the probability.

9. The method of claim 8, wherein the probability is determined based on one or more of a first probability of the observed label being the true label for the corresponding data sample, a second probability of the true label for the corresponding data sample being a trusted label from the first portion of the dataset given the observed label of the data sample, and a probability distribution of features of the data sample having the observed label and the corresponding trusted label.

10. The method of claim 8, the method further comprising:
   determining a portion of the remaining dataset with a set of first data samples where corresponding observed labels are not true labels; and
   updating the portion of the remaining dataset by replacing the corresponding labels with a trusted label from the first portion of the dataset.

11. The method of claim 8, wherein a size of the first portion of the dataset is based at least in part on minimizing a weighted sum of sampling variances of features associated with the dataset.

12. The method of claim 8, wherein a size of the first portion of the dataset is based at least in part on a linear cost function.

13. The method of claim 8, wherein for each data sample of the remaining dataset, determining whether a corresponding observed label is a true label is based at least in part on assuming that the true labels of the data samples are related to the corresponding observed labels.

14. A non-transitory computer readable medium having instructions stored thereon, wherein the instructions, when executed by at least one processor, cause a device to perform operations comprising:
   obtaining training data;
   dividing the training data into a trusted dataset and an untrusted dataset, wherein the trusted dataset is selected using stratified sampling;
   generating a first classification model based on the remaining dataset;
   generating an updated untrusted dataset by simulating exposure of the untrusted dataset to an adversarial process;
   generating a second classification model based on the updated untrusted dataset;
   updating labels in the untrusted dataset to generate updated untrusted dataset based at least in part on trusted labels in the trusted dataset and injecting noise in the untrusted dataset, wherein the updating is based on an estimated reverse transformation function for the first classification model and the second classification model;
   generating updated training data by combining the trusted dataset and updated untrusted dataset; and
   training a machine learning model based on the updated training data by:
      for each data sample of the untrusted dataset, determining a probability of the corresponding observed label being a true label; and
      determining, for each data sample of the untrusted dataset, whether the corresponding observed label is a true label based on the probability, wherein determining whether the corresponding observed label is the true label is based on a confidence of having correctly determined the probability.

* * * * *